United States Patent [19]
Lippincott

[11] Patent Number: 5,367,339
[45] Date of Patent: Nov. 22, 1994

[54] BLACK IMAGE DETECTION CIRCUITRY

[75] Inventor: Louis A. Lippincott, Roebling, N.J.

[73] Assignee: Intel Corporation, Santa Clara, Calif.

[21] Appl. No.: 178,459

[22] Filed: Jan. 6, 1994

Related U.S. Application Data

[63] Continuation of Ser. No. 954,742, Sep. 30, 1992, abandoned.

[51] Int. Cl.$^5$ .............................. H04N 5/275
[52] U.S. Cl. ...................... 348/592; 348/591
[58] Field of Search ............... 348/578, 584, 587, 591, 348/592, 590; H04N 5/272, 5/222, 5/275

[56] References Cited

U.S. PATENT DOCUMENTS 4,200,890  4/1980  Inaba et al. ...................... 358/183

FOREIGN PATENT DOCUMENTS 197805   5/1978   France ................ H04N 5/22
132186  10/1980   Japan ................. H04N 5/22
1556811  5/1976   United Kingdom ...... H04N 9/535

OTHER PUBLICATIONS

John Markus, Electronic Circuits Manual, 1971 McGraw-Hill Book Company p. 127.

Primary Examiner—Victor R. Kostak
Assistant Examiner—Nathan J. Flynn
Attorney, Agent, or Firm—William H. Murray

[57] ABSTRACT

A chroma keying device is provided for switching between graphics images and video images. An input signal and a reference are compared to provide a switching signal for performing the switching between graphics and video. A switching signal is provided when the input signal color information indicates that the input signal represents a true black image. Thus, switching is triggered upon black in the chroma keying device of a present invention. The black level is determined when each of the red, blue and green inputs of the device receives substantially zero current. A very sensitive comparison is performed between these input lines and a reference voltage in order to detect this condition. In the chroma keying device of the present invention, this sensitive comparison is accomplished using matched diodes within a common integrated circuit.

6 Claims, 1 Drawing Sheet

BLACK IMAGE DETECTION CIRCUITRY

This is a continuation of copending of application Ser. No. 07/954,742 filed on Sep. 30, 1992 now abandoned.

BACKGROUND OF THE INVENTION

1. Field of the Invention

This invention relates to the field of video signal processing and, in particular, to the field of chroma keying circuits.

2. Background Art

Chroma keying circuits are required to detect very small changes in voltage and switch between video images and graphical images very quickly. In current state of the art equipment the switching rate required may be as high as forty-five megahertz. The voltage changes which are detected in these circuits in order to trigger a switch between video and graphical images may be only fifteen millivolts. Logic changes from zero to five volts on the output logic signal are often required. Thus the five volt switching signal is based upon a change in a video signal which is very fast and has a very small magnitude change. Sometimes this does not work properly creating distortions around the edges of images. Therefore it would be advantageous to develop a chroma keying signal that would more reliably key in on a video signal.

It is known in the art of switching between graphics signals and video signals to provide circuits which chroma key using blue. Thus, a video image against a blue background could be superimposed upon a graphics image by switching to the graphics image when the video image is blue and switching back to the video image when the video image is not blue. However, this prevented the use of blue within the video image. For example, a video image of a person with a tie having small amounts of blue may cause small portions of the graphics image to appear on the tie when the combined image is displayed. It has also been known for this to occur in images of people with blue eyes. Another problem with chroma keying on blue is that it is difficult to provide circuitry which can reliably and quickly distinguish between near blue and true blue.

SUMMARY OF THE INVENTION

A chroma keying device is provided for switching between graphics images and video images. An input signal and a reference are compared to provide a switching signal for performing the switching between graphics and video. A switching signal is provided when the input signal color information indicates that the input signal represents a true black image. Thus, switching is triggered upon black in the chroma keying device of a present invention. The black level is determined when each of the red, blue and green inputs of the device receives substantially zero current. A very sensitive comparison is performed between these input lines and a reference voltage in order to detect this condition. In the chroma keying device of the present invention, this sensitive comparison is accomplished using matched diodes within a common integrated circuit.

BRIEF DESCRIPTION OF THE DRAWING

The drawing is a schematic representation of the black detect circuit for switching between graphics signals and video based upon input graphics signals in a video processing circuit.

DETAILED DESCRIPTION OF THE INVENTION

Figure 1:
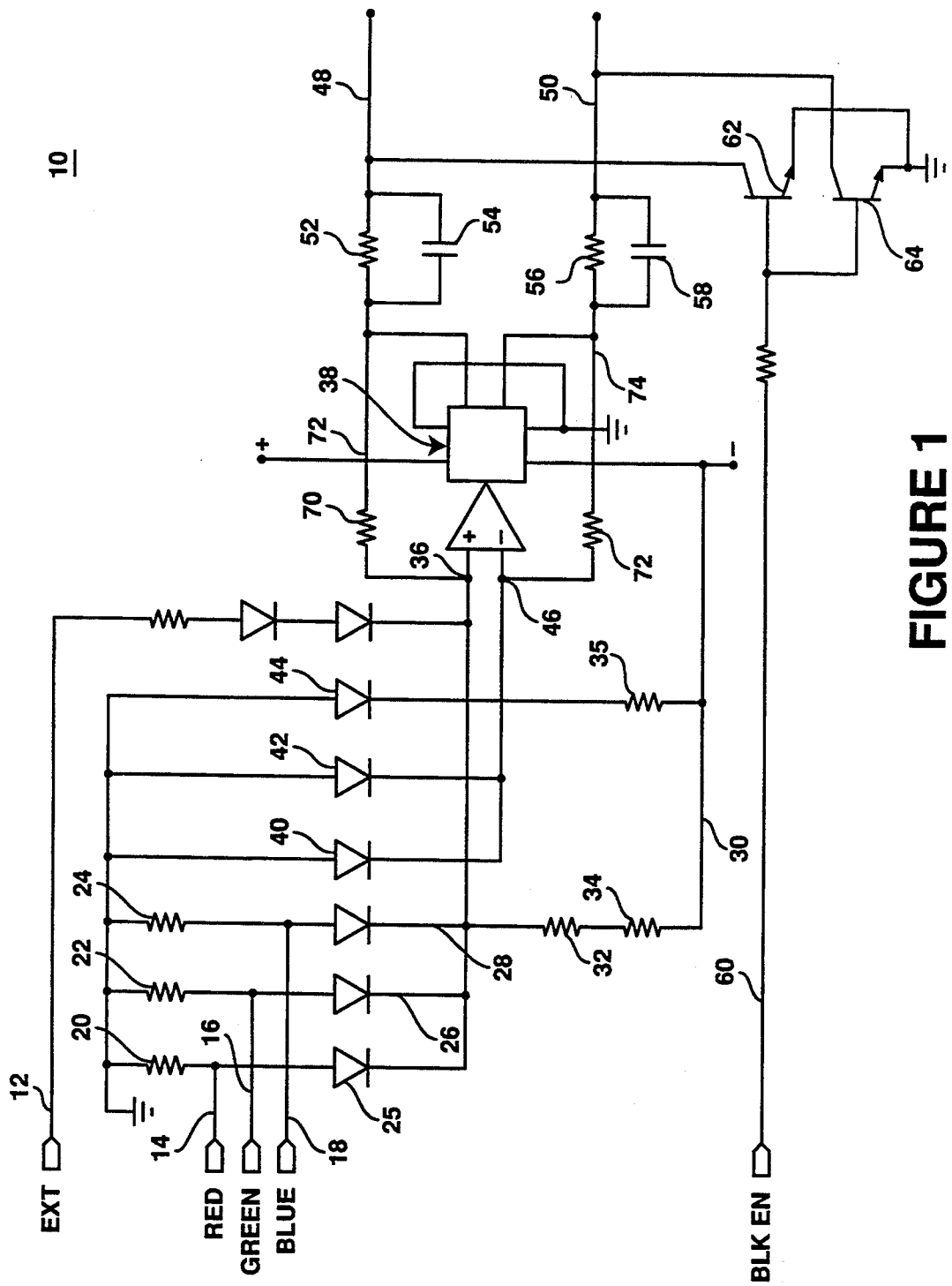

Referring now to the drawing, there is shown black image detection circuit 10 of the present invention. Black image detection circuitry 10 is adapted for switching between graphical signals and video signals in a video processing system using chroma keying based upon true black. The chroma keying of black image detection circuitry 10 may be based upon a graphics input signal applied to graphics input lines 14, 16, 18. Black detector output lines 48, 50 of black image detection circuitry 10 in response to switching of reference comparator 38 may then be used to enable the switching between graphics signals and video signals in a video processing system in accordance with graphics input signals applied to lines 14, 16 and 18.

Black image detection circuitry 10 is thus provided with red graphics input line 14, green graphics input line 16, and blue graphics input line 18 for receiving the three color component signals of a conventional graphics image. It will be understood by those skilled in the art that when an input graphics signal applied to black image detection circuitry 10 is true black, there may be essentially no current through graphics input terminating resistors 20, 22, 24 because essentially zero volts is applied to graphics input lines 14, 16, 18 respectively.

Consider a hypothetical situation in which: (1) there are no influences operating upon graphics input terminating resistors 20, 22, 24 other than the graphics signals of graphics input lines 14, 16, 18, and (2) the graphics signals of graphic input lines 14, 16, 18 represent true black wherein true black is understood to be represented by zero voltage on all three input lines 14, 16, 18. In this case input terminating resistors 20, 22, 24 would be essentially at ground potential because the other side of each input resistor 20, 22, 24 is grounded. Thus, in this hypothetical situation, there would be no current through input terminating resistors 20, 22, 24 of detection circuitry.

However, in black image detection circuit 10 of the present invention, input terminating resistors 20, 22, 24 are in fact connected to negative bias 30 by way of input diodes 25, 26, 28 and by way of negative biasing resistors 32, 34. When negative biasing resistors 32, 34, coupled to negative bias 30, provide the negative bias for input graphics signals of black image detection circuitry 10 through input diodes 25, 26, 28, this causes a very small amount of current through grounded input terminating resistors 20, 22, 24. The small current through input terminating resistors 20, 22, 24 causes resistors 20, 22, 24 to have a potential slightly below ground when the graphics signals applied to graphics input lines 14, 16, 18 is true black.

The signals at the cathode side of input diodes 24, 26, 28 are OR'ed at input level node 36 and the signal of input level node 36 is applied to an input of voltage reference comparator 38 for comparison against voltage reference level node 46. This comparison of the input level of input level node 36 and the reference level of reference level node 46 by reference comparator 38 permits black image detection circuitry 10 to detect when the voltage level of any one of the three input resistors 20, 22, 24 rises above the negative bias as previously described.

The reference voltage of reference level node 46 is generated by using reference diodes 40, 42, 44. Reference diodes 40, 42, 44 are selected to be substantially identical or substantially matched to input diodes 25, 26, 28. Furthermore, reference diodes 40, 42, 44 are biased to conduct the same amount of current as input diodes 25, 26, 28 by selecting negative biasing resistors 32, 34 of input diodes 25, 26, 28 to have substantially the same combined resistance as the resistance of negative biasing resistor 35 of reference diodes 40, 42, 44.

If the current through reference diodes 40, 42, 44 is substantially equal to the current through input diodes 25, 26, 28, the voltages across the two sets of diodes is substantially equal when the two sets of diodes are matched. It will be understood by those skilled in the art that this may be achieved by applying diodes in an array of diodes formed on a single integrated circuit chip and therefore having substantially similar electrical characteristics.

Thus, when diodes 25, 26, 28, 40, 42, 44 are matched the only difference in potential between the two inputs of reference comparator 38 on voltage level nodes 36, 46 is the difference due to current through input terminating resistors 20, 22, 24 as applied by the input graphics signal. This may also be understood by modelling input terminating resistors 20, 22, 24, which may be seventy five ohms, as short circuits coupling the cathodes of input diodes 25, 26, 28 to ground. In this model of this portion of detection circuit 10, the circuit branch formed by input diodes 25, 26, 28 is exactly the same as the circuit branch formed by reference diodes 40, 42, 44. In this case these voltage level nodes would have substantially the same potential.

If a graphic signal applied to graphics input lines 14, 16, 18 of black image detection circuitry 10 represents some color other than true black, one or more of red graphics input line 24, green graphics input line 16, or blue graphics input line 18 goes above ground potential. When at least one of graphics input lines 14, 16, 18 is above ground potential it supplies current to at least one input diode 25, 26, 28 of black image detection circuit 10. When current is supplied to at least one input diode 25, 26, 28 there is a change in the voltage on input level node 36 of reference comparator 38. This causes the voltage level of input level node 36 to rise above the voltage level of reference level node 46. High speed reference comparator 38 switches its output state in response to this. When an input signal causes this switch in the output state of reference comparator 38 it is detected by black image detection circuitry 10 as a non-black graphics input. This change in the output state of reference comparator 38 is presented at enable output lines 48, 50 of black detection circuitry 10.

The response of black image detection circuitry 10 to the switching of voltage reference comparator 38 must be fast enough to switch at video pixel rates. Therefore, in the preferred embodiment of black image detection circuitry 10, there is no further logic circuitry coupled between the output of reference comparator 38 and black detector output lines 48, 50. Any further logic circuitry of this nature would slow the switching of the signals of black detector output lines 48, 50.

Black detector output lines 48, 50 of reference comparator 38 are each provided with a resistor/capacitor network. The resistor/capacitor network of detector output line 48 is formed of resistor 52 and capacitor 54. The resistor/capacitor network of detector output line 50 is formed of resistor 56 and capacitor 58. The two resistor/capacitor networks formed of resisters 52, 56 and capacitors 54, 58 provide the output of black image detection circuitry 10 with a high dc impedance while maintaining a low ac impedance.

The high dc impedance permits essentially shorting output lines 48, 50 to ground without damage to reference comparator 38 in order to enable and disable the output of reference comparator 38 independently of any graphics input signals applied to graphics input lines 12, 14, 16, 18. The low ac impedance enables black image detection circuitry 10 to be matched to, and to apply this output signal to, further circuitry (now shown) adapted for switching between graphics signals and video signals. The ability to enable and disable reference comparator 38 in this manner permits the enabling and disabling the operations of black image detection circuitry 10 within an image processing system.

Thus the signal of black enable line 60 of black image detection circuitry 10 may be used as an enable signal for the output of detection circuitry 10. Black enable line 60 may therefore be used to override black image detection circuitry 10 by drawing detector output lines 48, 50 to ground regardless of the input graphics levels applied to graphics input lines 12, 14, 16, 18. When the voltage level of black enable line 60 is high, enable/disable transistors 62, 64 are turned on and detector output lines 48, 50 of black detection circuitry 10 are grounded regardless of the levels of nodes 36, 46 of reference comparator 38.

In this manner, black detect in a system using black image detection circuitry 10 may be disabled. Similarly, if black enable line 60 is low, detector output lines 48, 50 are permitted to go high thereby allowing black image detection circuitry 10 to control the state of detector output lines 48, 50 in accordance with the signals applied to graphics input lines 14, 16 and 18. When black detection circuit is thus enabled using enable line 60 there must be true black on input graphics lines 14, 16, 18 in order for output lines 48, 50 to be triggered as previously described.

Feedback from the output of voltage reference comparator 38 to input level node 36 is provided by way of input feedback resistor 70. In a similar manner, feedback to reference level node 46 is provided by way of reference feedback resistor 72. Feedback resistors 70, 72 are provided in black image detection circuitry 10 in order to provide hysteresis for the switching of reference comparator 38.

Thus if reference comparator 38 switches when input level node 36 goes higher than reference level node 46, output node 72 of reference comparator 38 goes high. A high level on comparator output node 72 puts a higher bias on input level node 36 by way of feedback resistor 70 or hysteresis resistor 70. Thus when the level at input level node 36 reaches a trigger threshold the voltage at node 36 is forced to sharply rise a little further than the trigger threshold because of the higher bias from the switched output of comparator 38. This new level may be seen as the hysteresis threshold. If there is any noise on input level node 36, it must overcome the new hysteresis threshold in order to reverse the switching of reference comparator 38. A similar hysteresis is provided by way of feedback resistor 72 or hysteresis resistor 72 applied to reference level node 46. The signal of hysteresis resistor 72 is the inverse of the signal of hysteresis resistor 70 and pulls the level of reference node 46 lower thereby increasing the amount of hysteresis.

These two hysteresis loops within detection circuitry 10 have the effect of providing very clean transitions between graphics signals and video signals when the input graphics signal contains transitions from near black to true black or from true black to near black. This permits the use of black image detection circuitry 10 when images contain very dark blue or other colors very similar to true black. It will be understood that these near black colors appear as black to a viewer of the processed images. Even though colors close to true black may appear black to a viewer of the combined images, they do not cause reference comparator 38 of black image detection circuitry 10 to trigger. Detection circuitry 10 does not trigger because at least one input resistor 20, 22, 24 will be pulled above ground causing reference comparator 38 to switch under this condition.

Switching between true black and near black is also assisted by the biasing of detection circuitry 10. Instead of using zero volts at input level node 36, resistors 32, 34, 35 apply a negative bias as previously described. Thus, when a graphics input signal is actually zero volts, the resistor biases below ground. This makes it slightly easier for black image detection circuitry 10 to detect because current is shut off and it allows the bias current to pull the resistors below ground. This further facilitates use of colors that are very close to black while still permitting detection circuitry 10 to detect true black.

It will be understood that various changes in the details, materials and arrangements of the parts which have been described and illustrated in order to explain the nature of this invention, may be made by those skilled in the art without departing from the principle and scope of the invention as expressed in the following claims.

I claim:

1. A chroma keying device having means for receiving an input signal to provide a switching signal to select one of at least two image signals in accordance with said input signal, comprising:

reference signal means for providing a reference signal;

said input signal having input signal color information with an information level of substantially zero when said input signal is representative of a black image;

comparison means having first and second substantially equally biased comparison inputs for receiving said input signal color information and said reference signal to provide a switching signal in accordance with said first and second comparison inputs when said information level is substantially zero;

selecting means for selecting one of said image signals in accordance with said switching signal.

2. The chroma keying system of claim 1, wherein said at least two image signals comprise a graphic signal and a video signal.

3. The chroma keying system of claim 2, wherein said input signal comprises said graphics signal.

4. The chroma keying device of claim 1, wherein said equal biasing is provided by matched diodes.

5. The chroma keying system of claim 4, wherein at least one of said first and second comparison inputs is provided with a negative bias.

6. The chroma device of claim 1, wherein at least one of said first and second comparison inputs is provided with feedback hysteresis in accordance with said switching signal.

* * * * *

UNITED STATES PATENT AND TRADEMARK OFFICE
CERTIFICATE OF CORRECTION

PATENT NO. : 5,367,339
DATED : November 22, 1994
INVENTOR(S) : Louis A. Lippincott It is certified that error appears in the above-indentified patent and that said Letters Patent is hereby corrected as shown below:

Column 6, line 21, "system" should read --device--

Column 6, line 24, "system" should read --device--

Column 6, line 28, "system" should read --device--

Signed and Sealed this

Eighteenth Day of April, 1995

*Attest:*

BRUCE LEHMAN

*Attesting Officer*         Commissioner of Patents and Trademarks